No. 646,226. Patented Mar. 27, 1900.
H. KLEMAN.
NUT LOCK.
(Application filed June 22, 1898. Renewed Nov. 4, 1899.)
(No Model.)
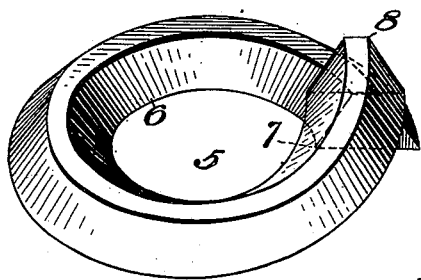
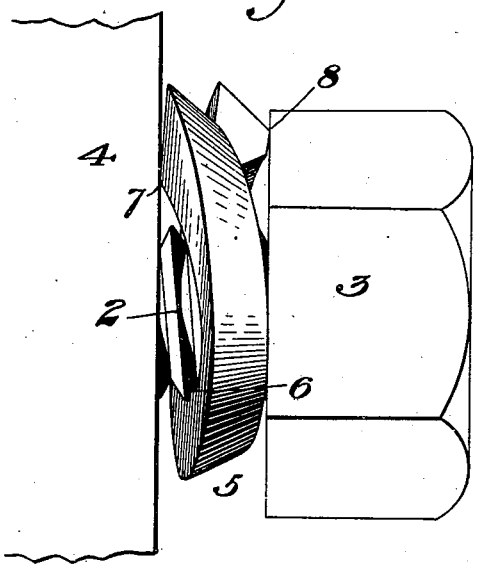
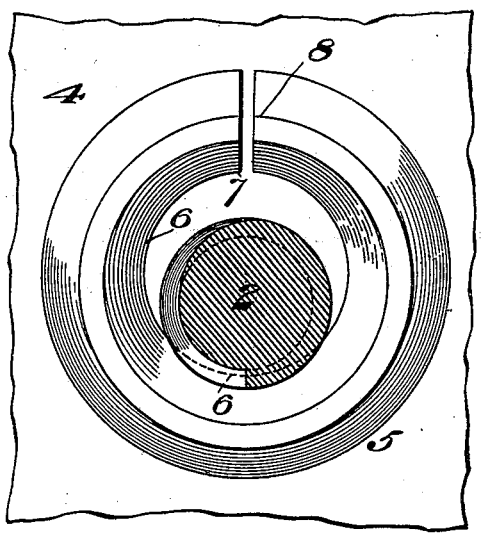
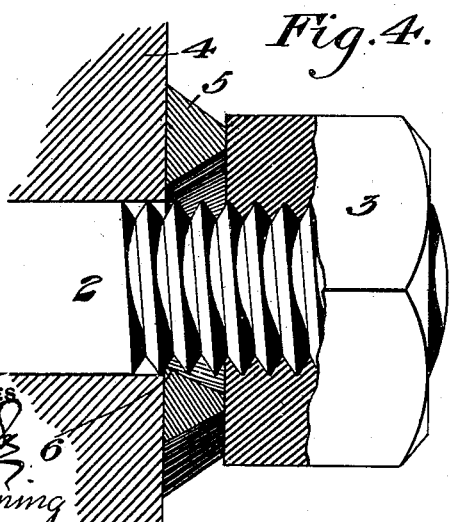
WITNESSES
INVENTOR
Henry Kleman
by Bakewell & Bakewell
his attys.

UNITED STATES PATENT OFFICE.

HENRY KLEMAN, OF PITTSBURG, PENNSYLVANIA, ASSIGNOR OF ONE-EIGHTH TO HARRY J. RESE, OF ALLEGHENY, PENNSYLVANIA.

NUT-LOCK.

SPECIFICATION forming part of Letters Patent No. 646,226, dated March 27, 1900.

Application filed June 22, 1898. Renewed November 4, 1899. Serial No. 735,842. (No model.)

*To all whom it may concern:*

Be it known that I, HENRY KLEMAN, of Pittsburg, in the county of Allegheny and State of Pennsylvania, have invented a new and useful Improvement in Nut-Locks, of which the following is a full, clear, and exact description, reference being had to the accompanying drawings, forming part of this specification, in which—

Figure 1 is a perspective view of my improved nut-lock. Fig. 2 is a vertical section taken through a portion of the bolt with the nut-lock partially compressed. Fig. 3 is a vertical cross-section in the rear of the nut, and Fig. 4 is a view similar to Fig. 2 with the parts in final position.

My invention relates to that class of nut-locks wherein a helical spring-washer is provided at its ends with biting-points, which engage, respectively, with the nut and with the object through which the bolt passes, and it is designed to greatly increase the locking power of such washers by so forming them that their intermediate portion will engage the thread of the bolt, thus locking the nut to the bolt and the bolt to the object through which it passes. Heretofore in this type of nut-locks the washer has been coiled in the opposite direction to that of the thread upon the bolt and the biting-point, which engages the nut, extended in the same direction in which the nut is rotated to its position.

My invention consists in providing a helical spring-washer the helix of which is coiled in the same direction as that of the thread upon the bolt, this washer having a biting-point which extends against the direction of rotation of the nut.

It also consists in the above washer wherein the inner edge of the washer is shaped so as to at least partially engage the thread of the bolt, the outer biting-point engaging the nut, while the inner biting-point engages the object through which the bolt extends; and it consists, further, in a spiral washer the inner biting-point of which is outside the outer biting-point, so that the leverage of the nut is less than the lever-arm of the object through which the bolt passes, as well as in the construction of the parts, as hereinafter more fully described, and set forth in the claims.

In the drawings, 2 represents the bolt, 3 is the nut, and 4 the fish-plate.

5 is the washer, which is of general triangular cross-section, with the outer edge slightly flattened. This washer is of helical form, the pitch of the helix being preferably the same and extending in the same direction as the thread of the bolt in connection with which the washer is used. The sharp inner edge 6 of the washer is arranged to enter the thread of the screw, while the inner biting-point 7 engages the fish-plate and the outer biting-point 8 engages the nut. The triangular shape of the washer brings the outer biting-point inside the inner one, so that the washer has a shorter lever-arm than that of the inner biting-point. It will be noted that the outer biting-point is directed against the rotary movement of the nut, so that as the nut is turned home it bears directly against this biting-point. The washer is preferably made of sufficient size so that it will slip loosely over the bolt, and when the nut is screwed to place it will throw the washer into eccentric position, so that it will engage the thread of the nut for about one-third of its circumference. The position of the parts when in final position is clearly shown in Fig. 4, the washer being compressed laterally in opposition to its spring action and engaging the nut and the fish-plate or splice-bar with its biting-points, while its inner sharp edge engages in a portion of the screw-thread and upsets the thread at the points where it crosses the threads.

The advantages of my invention will be apparent to those skilled in the art. By reason of the helical washer engaging the screw-thread of the bolt the nut is locked to the bolt, as is also the fish-plate, the three parts thus interacting to prevent movement of the nut. The triangular cross-section of the washer brings the bearing-point of the nut inside that upon the article through which the bolt passes and provides the sharp inner edge to engage the screw-thread. The washer can be as easily and cheaply made as the ordinary spiral washer and is much more effective in its action.

The washer may be made of a suitable size to fit in the screw-threads, so that it is screwed upon the bolt and acts as a supplemental nut, and many other changes may be made without departing from my invention, since

I claim—

1. A helical spring-washer having a sharp inner edge arranged to engage the screw of the bolt and an outer biting-point; substantially as described.

2. A nut-lock consisting of a helical spring-washer having an inner edge arranged to engage the screw-thread of the bolt, and biting-points at its ends; substantially as described.

3. A helical spring-washer, of triangular cross-section, having its inner edge arranged to engage the screw-thread of the bolt, and biting-points at its ends; substantially as described.

4. A nut-lock, consisting of a helical spring-washer, having an inner biting-point located farther away from the center of the washer than its outer biting-point so as to give the nut a shorter lever-arm; substantially as described.

5. The combination with a bolt and nut, of a nut-lock consisting of a helical spring-washer of triangular cross-section, the base of the triangle being adjacent to the article through which the bolt passes, the washer having an inner sharp edge to engage the screw-thread of the bolt, and biting-points at its ends engaging the nut and the article respectively; substantially as described.

In testimony whereof I have hereunto set my hand.

HENRY KLEMAN.

Witnesses:
F. E. GAITHER,
G. B. BLEMMING.